(12) United States Patent
Zhu

(10) Patent No.: US 11,524,774 B2
(45) Date of Patent: Dec. 13, 2022

(54) AUTOMOBILE ENGINE

(71) Applicant: Xiaoyi Zhu, Shenzhen (CN)

(72) Inventor: Xiaoyi Zhu, Shenzhen (CN)

( * ) Notice: Subject to any disclaimer, the term of this patent is extended or adjusted under 35 U.S.C. 154(b) by 350 days.

(21) Appl. No.: 16/811,864

(22) Filed: Mar. 6, 2020

(65) Prior Publication Data

US 2020/0207466 A1 Jul. 2, 2020

Related U.S. Application Data

(63) Continuation of application No. 15/293,223, filed on Oct. 13, 2016, now abandoned, which is a
(Continued)

(30) Foreign Application Priority Data

Nov. 17, 2014 (CN) .......................... 201410653323.0
Jan. 23, 2015 (CN) .......................... 201510035639.8
(Continued)

(51) Int. Cl.
*B64C 27/16* (2006.01)
*F01D 5/12* (2006.01)
(Continued)

(52) U.S. Cl.
CPC .............. *B64C 27/16* (2013.01); *B64C 11/16* (2013.01); *B64C 11/24* (2013.01); *B64C 27/473* (2013.01);
(Continued)

(58) Field of Classification Search
CPC ......... F02F 3/0076; F02B 19/00; F02B 23/04; F02B 39/02
(Continued)

(56) References Cited

U.S. PATENT DOCUMENTS 8,528,514 B1 * 9/2013 Erlandson ............... F02B 23/08
123/193.6
2011/0293421 A1 12/2011 Denner et al.

FOREIGN PATENT DOCUMENTS

EP 365906 A * 5/1990 .............. F02B 19/14
EP 0462424 A1 * 12/1991
(Continued)

*Primary Examiner* — Mahmoud Gimie
(74) *Attorney, Agent, or Firm* — Stein IP, LLC

(57) ABSTRACT

The present invention provides a power device generating greater propelling force and finds that traditional power devices do not include all propelling forces based on the fundamental core propelling force source problem. External pressure is guided to the traditional power devices since the inner speed is higher the outer speed, power consumption for overcoming fluid resistance is high, and mutual contradiction results are obtained. The unique difference between the present invention and general common sense lies in opposite fluid pressure directions; inner fluid channels and outer fluid channels with higher flow speeds are formed to generate pressure differences which guides the fluid pressure to the outside and serve as propelling force, and thus the present invention creatively finds three propelling force sources, two lifting force or propelling force sources of helicopters or airplanes driven by propellers and two propelling force sources for sufficient burning of fuel in combustion chambers of engines.

11 Claims, 5 Drawing Sheets

Related U.S. Application Data continuation-in-part of application No. PCT/CN2015/094437, filed on Nov. 12, 2015.

(30) Foreign Application Priority Data

| Jan. 23, 2015 | (CN) | ......................... 201510036701.5 |
| Jan. 23, 2015 | (CN) | ......................... 201510036703.4 |
| Jan. 23, 2015 | (CN) | ......................... 201510036791.8 |

(51) Int. Cl.

| F01D 1/32 | (2006.01) |
| B64C 11/16 | (2006.01) |
| F02F 3/00 | (2006.01) |
| F02B 23/04 | (2006.01) |
| F02B 19/00 | (2006.01) |
| B64C 11/24 | (2006.01) |
| B64C 27/473 | (2006.01) |
| F01K 25/02 | (2006.01) |
| F02B 39/02 | (2006.01) |
| F02C 3/107 | (2006.01) |

(52) U.S. Cl.
CPC ................. *F01D 1/32* (2013.01); *F01D 5/12* (2013.01); *F01K 25/02* (2013.01); *F02B 19/00* (2013.01); *F02B 23/04* (2013.01); *F02B 39/02* (2013.01); *F02C 3/107* (2013.01); *F02F 3/0076* (2013.01)

(58) Field of Classification Search
USPC ....................................... 123/193.6
See application file for complete search history.

(56) References Cited

FOREIGN PATENT DOCUMENTS

| GB | 497048 A | 12/1938 | |
| JP | 57159944 A | * 10/1982 | |
| JP | 2000008859 A | * 1/2000 | .......... F02B 23/0627 |
| JP | 2005330814 A | * 12/2005 | |

\* cited by examiner

AUTOMOBILE ENGINE

CROSS-REFERENCE TO RELATED APPLICATIONS

This application is a continuation application of U.S. application Ser. No. 15/293,223, filed Oct. 13, 2016 now pending, which is a continuation-in-part of International Application No. PCT/CN2015/094437, filed Nov. 12, 2015, which claims the benefit of priority to Chinese Application No. 201510035639.8, filed Jan. 23, 2015, Chinese Application No. 201510036703.4, filed Jan. 23, 2015, Chinese Application No. 201510036701.5, filed Jan. 23, Chinese Application No. 201510036791.8, filed Jan. 23, 2015 and Chinese Application No. 201410653323.0, filed Nov. 17, 2014, in the State Intellectual Property Office. All disclosures of the documents named above are incorporated herein in their entireties by reference.

TECHNICAL FIELD

The present invention relates to power devices, in particular to a power device capable of generating greater propelling force.

DESCRIPTION OF RELATED ART

In the two hundred years since the Industrial Revolution to now, the basic theory and structure for power devices to generate propelling force sources have never changed; a theory or method or device which can effectively overcome the fluid resistance is not available, and consequentially, the actual energy utilization rate of existing power devices such engines, gas turbine motors and power generators is low.

Based on the fundamental core problem that the propelling force sources can be generated by the power devices, the inventor finds that traditional power devices do not include all the propelling force, greater propelling force sources exist and are not found yet, and thus it is necessary to provide a power device which can generate greater propelling force through power or external force.

BRIEF SUMMARY OF THE INVENTION

The present invention is based on the fundamental core problem that the propelling force sources can be generated by the power devices, and the propelling force sources of the present invention are completely different from the propelling force sources, generated by counter-acting force, used by the traditional power devices for hundreds of years; in this way, three propelling force sources which are generated pressure differences and are not utilized in the space and time are found on this basis, and a novel approach is created for the development of the power devices.

The present invention aims to realize the technical purpose that greater propelling force sources are obtained by establishing a novel power source theory, method and device based on the pressure difference generated due to the different flow speeds of an inner layer and an outer layer.

When an impeller of a traditional power device is driven by power or external force to rotate, the fluid distribution state of the traditional power device is that an inner fluid layer and an outer fluid layer which have different flow speeds are generated on a shell body of the impeller, wherein the inner layer which is located on the surface of the shell body and has the high flow speed equal to the flow speed of the shell body is a high-speed layer, and the flow speed is decreased outwards gradually till the outer layer which has the low flow speed equal to the environment flow speed within a wide range and serves as a low-speed layer: in this way, the high pressure generated by the low flow speed of the outer low-speed layer within the wide range inevitably transfers a pressure difference to the low pressure generated by the high flow speed of the inner high-speed layer in the direction from outside to inside, and accordingly fluid resistance is generated by the pressure difference. According to the traditional power device, the fluid pressure within the wide range, around the traditional power device, of the outside is guided to the traditional power device, mutual contradiction is caused, about 90% of power has to be consumed to overcome the fluid resistance, and this is a new understanding about the generation of the fluid resistance of the present invention.

The present invention is different from the traditional power device on the new aspect that an inner layer is a low-speed layer, an outer layer is a high-speed layer, and a pressure difference in the direction from inside to outside is generated due to the different flow speeds of the inner layer and the outer layer; the fluid pressure generated in water and air is guided to the outside around, so that the fluid pressure is reduced, propelling force sources are obtained correspondingly, and the pressure difference serves as the propelling force; for example, if 10% of the fluid pressure is transferred to the outside, the propelling force sources can be increased by at least over 50%; if 20% or 40% or 70% or even more fluid pressure is transferred to the outside, multifold propelling force sources can be obtained, and in other words, the energy utilization rate of the power device is increased by multiple times.

An impeller of the power device of the present invention is driven by power or external force, can be in different shapes and can be an impeller provided with fan blades or an impeller not provided with fan blades or a rotary impeller or a linearly moving impeller.

The propelling force sources of the present invention are the energy saved by reducing the fluid resistance through the pressure difference generated due to the different flow speeds of an inner channel and an outer channel of a shell body of the impeller, and the propelling force sources of the present invention are obtained on this basis. (Please see the Claims for the reference)

According to the first technical scheme adopted by the present invention for realizing the technical purpose:

A power device comprises an impeller connected with a rotary shaft, and fan blades arranged around the impeller; outer fluid channels and inner fluid channels which communicate with the outside are sequentially formed in shell bodies of the fan blades; the outer fluid channels communicate with the outside through a plurality of first air ports; flow disturbing devices which are concave and convex relative to the surfaces are arranged in the outer fluid channels; the pressure difference generated due to the different flow speeds of the outer fluid channels and the inner fluid channels serves as a propelling force source of the impeller.

Furthermore, the inner fluid channels communicate with the outer fluid channels through a plurality of second air ports, and the opening areas of the first air ports are larger than the opening areas of the second air ports.

Furthermore, the inner fluid channels communicate with the outside through a plurality of communicating pipes and/or a plurality of second air ports.

Furthermore, two or more first air ports are distributed in the whole windward side and/or leeward side of the shell body of each fan blade in the length direction of the fan blade; pressure differences are generated between the outer fluid channels and the inner fluid channels as well as between the outer fluid channels and the windward sides or between the outer fluid channels and the leeward sides due to the different flow speeds, and the pressure differences serve as propelling force sources of the fan blades.

Furthermore, the inner fluid channels are formed in the shell bodies of the fan blades locally or integrally; the inner fluid channels are hollow tubular structures, and the flow distributing devices are arranged on the outer walls of the hollow tubular structures in a surrounding mode.

Furthermore, the flow disturbing devices are flow disturbing surfaces or spiral flow disturbing surfaces which are concave and convex relative to the surfaces and are used for lengthening fluid channel paths.

Furthermore, exhaust ports are formed in the blade tip positions, in the length direction of the fan blades, on the shell bodies and located in the sides opposite to the fan blade rotating direction and communicate with the outer fluid channels.

Furthermore, the first air ports are formed in the front half portions, away from the impeller, of the shell bodies of the fan blades in the length direction of the fan blades, and/or the first air ports are formed in the sides, in the fan blade rotating direction, of the shell bodies in the length direction of the fan blades and communicate with the exhaust ports.

Furthermore, the power device comprises an air suction motor and an air suction pipe connected with the air suction motor; the air suction pipe communicates with the first air ports of the outer fluid channels.

Furthermore, the impeller is a propeller used for driving a helicopter or an airplane, and the pressure differences, between the inner fluid channels and the outer fluid channels in the fan blades of the propeller, generated on the surfaces of the shell bodies of the fan blades serve as the propelling force source of the fan blades.

Furthermore, pressure differences are generated due to the different paths of fluid passing through the fan blades in the length direction and the width direction, and the pressure differences serve as a lifting force or propelling force source.

The technical scheme has the beneficial effects that according to the power device driven by power or external force, high-pressure fluid generated in the low-flow-speed inner fluid channels in the shell bodies of the fan blades transfers the pressure differences to the low pressure generated in the high-flow-speed outer fluid channels, so that pressure difference transferring rings in the direction from inside to outside are formed around the shell bodies of the fan blades of the impeller, and the direction of outside fluid pressure is opposite to the direction of the pressure difference transferring rings; the fluid pressures in the two different directions encounter and are mutually counteracted, the fluid pressure is reduced to the corresponding extent according to the counteracted fluid pressure, and meanwhile the corresponding quantity of propelling force sources are obtained according to the reduced fluid pressure.

According to the second technical scheme provided by the present invention:

An automobile engine comprises an air cylinder, a combustion chamber and a piston, wherein the combustion chamber and the piston are arranged in the air cylinder; an inner fluid channel and an outer fluid channel communicating with the inner fluid channel are sequentially formed in the combustion chamber, a channel is formed in the piston, and the channel communicates with at least one of the outer fluid channel and the inner fluid channel in the combustion chamber; flow disturbing devices are arranged in the outer fluid channel and the channel.

Furthermore, the flow disturbing devices are flow disturbing surfaces or spiral flow disturbing surfaces which are concave and convex relative to the surfaces and are used for lengthening fluid passing paths, and the path of fluid passing through the channel in the piston is made longer than the path of the fluid passing through the inner fluid channel or the outer fluid channel.

According to the third technical scheme provided by the present invention:

A power device comprises an impeller connected with a rotary shaft, and an outer fluid channel and an inner fluid channel which communicate with the outside are sequentially formed in a shell body of the impeller; the outer fluid channel communicates with the outside through a plurality of first air ports; a flow disturbing device which is concave and convex relative to the surface is arranged in the outer fluid channel; the pressure difference generated due to the different flow speeds of the outer fluid channel and the inner fluid channel serves as a propelling force source of the impeller.

Wherein, the inner fluid channel communicates with the outer fluid channel through a plurality of second air ports, or the inner fluid channel communicates with the outside through a communicating pipe and a plurality of second air ports; the opening areas of the first air ports are larger than the opening areas of the second air ports.

Wherein, the flow disturbing device is a flow disturbing surface or a spiral flow disturbing surface which is concave and convex relative to the surface and used for lengthening a fluid channel path.

Wherein, the power device further comprises an exhaust port, and the exhaust port communicates with the outside through the outer fluid channel and the first air ports. The outer fluid channel and the inner fluid channel which communicate with the outside are locally formed in the shell body of the impeller, so that a high-speed fluid layer is formed, and a pressure difference and propelling force source is generated between the high-speed fluid layer and the shell body of the impeller.

The present invention has the beneficial effects that the power device is the impeller, namely the piston, which is driven by power to move linearly; on the premise that extra power consumption is avoided, a sufficient combustion space is provided for fuel through longer paths; the pressure difference and propelling force are generated between the inner channel and the outer channel.

Furthermore, a hollow shell body, a rotary shaft, and an air compressor, a combustion chamber and a turbine which are contained in the hollow shell body are further included in the scheme, and an annular impeller is further included; outer fluid channels and inner fluid channels are sequentially formed in shell bodies of fan blades of at least one of the air compressor, the annular impeller and the turbine which are coaxially connected with the rotary shaft in a non-concentric mode, the outer fluid channels and the inner fluid channels communicate with the outside, and the outer fluid channels communicate with the outside through a plurality of first air ports; flow disturbing devices are arranged in the outer fluid channels.

Furthermore, the annular impeller is located in the combustion chamber; the inner fluid channels and the outer fluid channels are formed in the shell bodies of the fan blades of the annular impeller; the inner fluid channels communicate with the outer fluid channels through a plurality of second air ports, and the outer fluid channels communicate with the combustion chamber through a plurality of first air ports.

The technical scheme has the beneficial effects that:

The power device is different from a turbine engine, in the prior art, which has the problems that generated propelling force is small, energy consumption is extremely high, it is extremely difficult to further increase the propelling force, and fuel cannot be sufficiently combusted; the present invention at least realizes the following effects that firstly, pressure difference transferring layers are formed by all stages of fan blades of the multi-stage air compressor and the multi-stage turbine, so that the fluid resistance is reduced to a certain extent, the speed of the impeller is increased to the corresponding extent, and the propelling force is increased to the corresponding extent, secondly, multifold pressure differences are generated between the windward sides or/and the leeward sides of all the stages of fan blades of the multi-stage air compressor and the multi-stage turbine, and then the pressure differences are accumulated stage-by-stage to form pressure difference propelling force which is much greater than original propelling force jointly; thirdly, an air suction port of the air suction motor communicates with the outer fluid channels of the fan blades of the air compressor, so that a pressure difference transferring layer is formed, and accordingly a propelling force source is generated.

Description of the Marks: multi-stage air compressor—1; air inlet—101; air outlet—102; combustion chamber—2; nozzle—201; annular impeller—3; piston—301, air cylinder—302; connecting rod—303; crankshaft—304; inner shell—31; outer shell—32; multi-stage turbine—4; rotary shaft—5; shell body—6; inner fluid channel—7, outer fluid channel (piston outer channel)—8; outer fluid channel in piston (piston inner channel)—801; bottom of the piston—802; first air port—9; second air port—10; flow disturbing surface—11; spiral flow disturbing surface—110; pressure difference transferring layer—12; inner wall—13; outer wall—14; high-speed fluid layer—15; communicating pipe—16; exhaust port—17; air suction motor—18; air suction pipe—19; impeller—20; fan blade—21.

DETAILED DESCRIPTION OF THE INVENTION

A detailed description of the technical content, purposes and effects of the present invention is given with accompanying embodiments and drawings as follows.

The key conception of the present invention lies in that the direction of the fluid pressure of a traditional impeller is changed; by arranging inner channels and outer channels with the flow speeds being higher than the flow speeds of the inner channels in fan blades of an impeller, pressure differences in the direction from inside to outside are generated; since the direction of the pressure differences is opposite to the direction of the inward pressure of fluid around, two fluid pressures in different directions are mutually counteracted, and the corresponding quantity of propelling force sources are obtained according to the counteracted fluid pressures.

Figure 1:
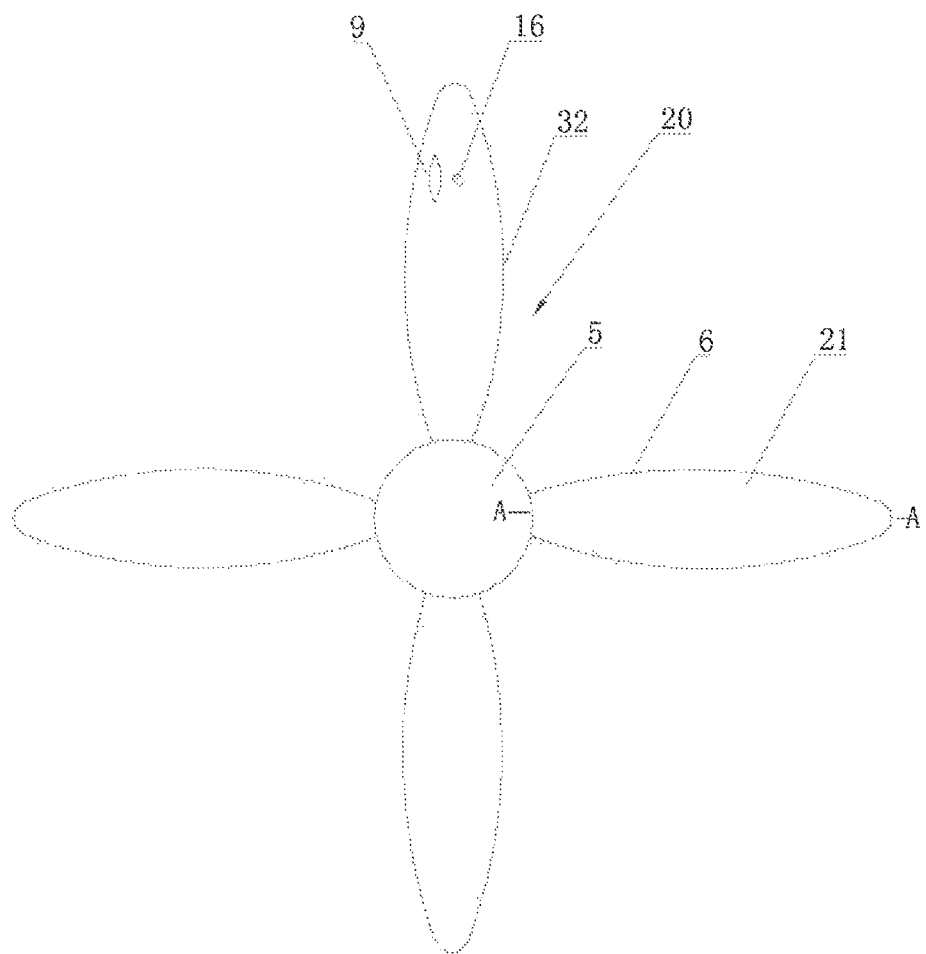
FIG. 1 is a structural schematic diagram of an impeller of a power device of one embodiment of the present invention.
Figure 2:
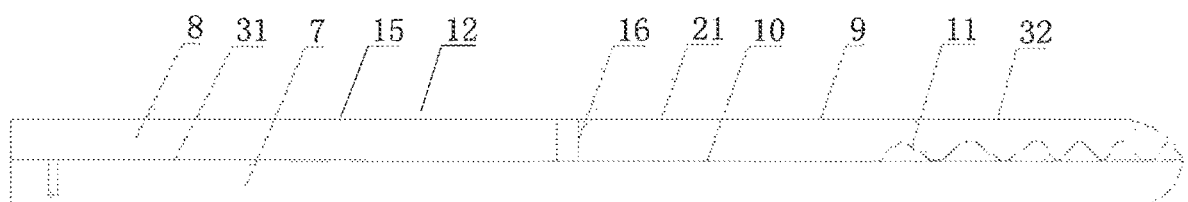
FIG. 2 is a structural schematic diagram of an A-A portion of an impeller of a power device of one embodiment of the present invention.

A first embodiment: Please see FIG. 1-3, a power device comprises an impeller 20 driven by power, outer fluid channels 8 and inner fluid channels 7 are sequentially formed in the windward sides and the leeward sides in outer shells 32 of a plurality of fan blades 21 of the impeller, the outer fluid channels 8 and the inner fluid channels 7 communicate with the outside through a plurality of first air ports 9 and a plurality of second air ports 10 correspondingly, and the first air ports 9 and the second air ports 10 are evenly distributed in the outer shells 32 of the fan blades in the whole length direction; the first air ports 9 communicate with the outer fluid channels 8, the second air ports 10 communicate with the inner fluid channels 7 through communicating pipes 16, the first air ports 9 communicate with exhaust ports 17 formed in the tail ends of the fan blades 21 through the outer fluid channels 8, and the air inlet areas of the first air ports 9 are larger than the air inlet areas of the second air ports 10. Flow disturbing surfaces 11 which are concave and convex relative to the surfaces are arranged in the outer fluid channels 8 to lengthen the paths of the fluid passing through the channels, and thus the flow speeds of the outer fluid channels are increased.

When the impeller 20 is driven by power to rotate at a high speed, the fluid with the flow speed equal to the speed of the impeller 20 enters the outer fluid channels 8 and the inner fluid channels 7 from the large first air ports 9 and the small second air ports 10 correspondingly. Great centrifugal force is generated through the high-speed rotation of the impeller 20, and under the effect of the traction of the extremely great power of the centrifugal force, the fluid is made to pass through the outer fluid channels 8, provided with the flow disturbing surfaces 11, in the fan blades 21 instantly through the multiple first air ports 9 in the outer shells 6 of the fan blades 21 and then is discharged rapidly from the exhaust ports 17 formed in the tail ends of the fan blades 21.

The flow speed of the fluid passing through the outer fluid channels 8 at a high speed is higher than that of the surrounding fluid with the flow speed equal to the speed of the impeller 20, so that the fluid around the multiple first air ports 9 in the outer shells 32 of the fan blades 21 is driven, the flow speeds around the multiple first air ports 9 are increased, and accordingly high-flow-speed and low-pressure fluid layers 15 which have approximately equal flow speeds and surround the outer shells 32 are formed on the windward sides and the leeward sides of shell bodies of the fan blades 21 and in the outer fluid channels 8 communicating with the shell bodies.

At the moment, part of the fluid on the outer shells 32 of the fan blades 21 enters the inner fluid channels 7 through the small second air ports 10 and the small-diameter communicating pipes 16, and thus the flow speed of the fluid is decreased; furthermore, barriers are arranged in the inner fluid channels 7, and thus the flow speed is further decreased. Since no flow disturbing surface 11 is arranged in the inner fluid channels 7 and no exhaust port 17 is formed in the inner fluid channels 7, flowing is unsmooth, and the flow speeds in the inner fluid channels 7 are lower than the flow speeds around the impeller 20 and are even lower than the flow speeds of the high-speed fluid layers 15. The high pressure generated by the low flow speeds in the inner fluid channels 7 transfers the pressure difference to the low pressure generated by the high flow speeds of the high-speed fluid layers 15 through the second air ports 10 evenly distributed in the windward sides and the leeward sides of the outer shells of the fan blades 21, and accordingly pressure difference transferring layers 12 are formed around the windward sides and the leeward sides of all the fan blades 21 of the impeller 20; the direction of the pressure difference is opposite to the direction of the inward pressure generated by the surrounding fluid, and the fluid pressures in the two opposite directions encounter and are mutually counteracted according to the natural law; the corresponding quantity of fluid pressure is prevented from approaching the shell bodies of the fan blades according to the quantity of the counteracted pressure, the fluid resistance is reduced to the corresponding extent, the rotating speed of the impeller is increased to the corresponding extent, the propelling force is increased to the corresponding extent, and the one-to-one corresponding interrelation exists.

Figure 4:
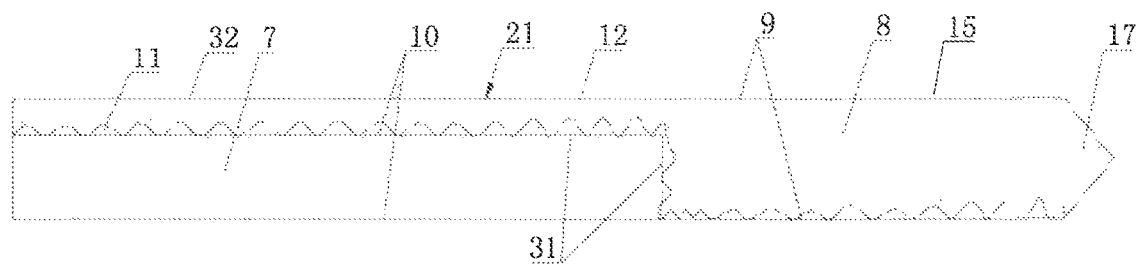
FIG. 4 is a structural schematic diagram of an A-A portion of an impeller of a power device of one embodiment of the present invention.
Figure 5:
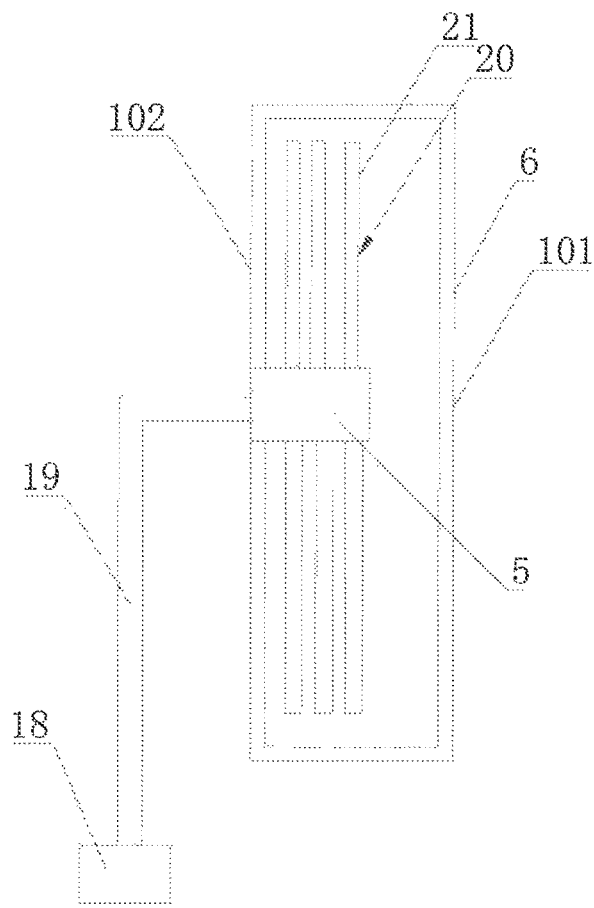
FIG. 5 is an integral structural schematic diagram of a power device of one embodiment of the present invention.
Figure 6:
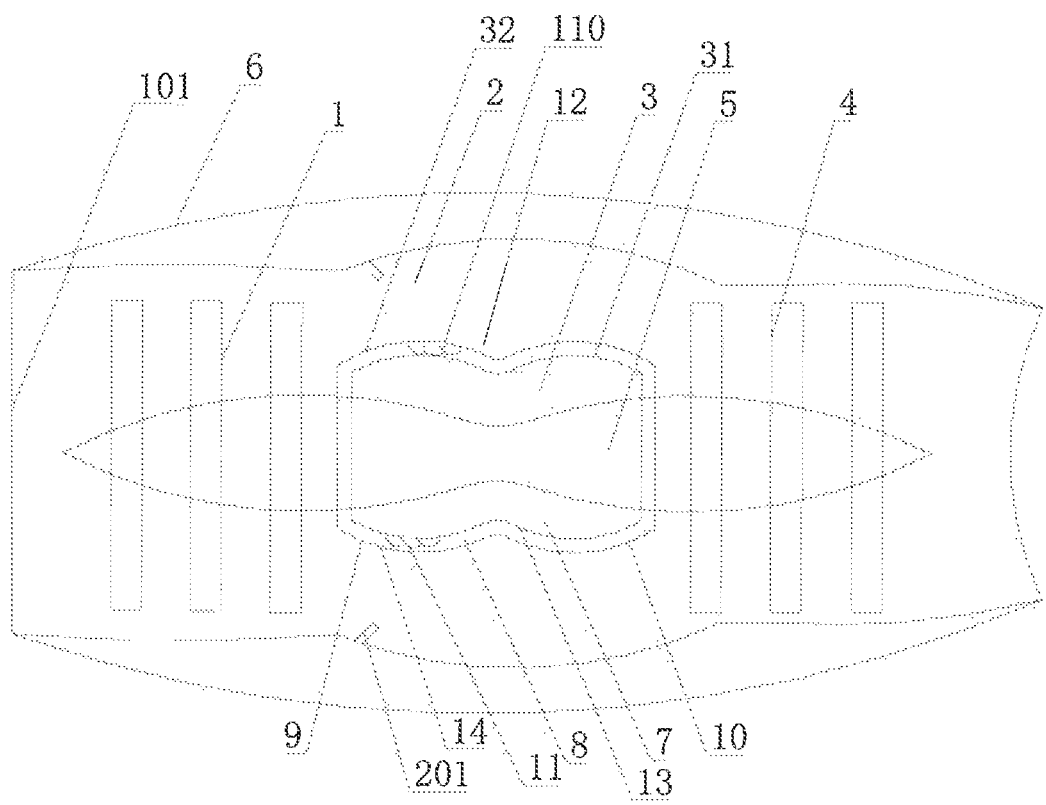
FIG. 6 is an integral structural schematic diagram of a turbine engine of one embodiment of the present invention.

Furthermore, as is shown in FIG. 4, the interiors of the shell bodies of the fan blades 21 are separated locally or integrally through partition plates, and thus the inner fluid channels 7 are locally or integrally formed in the shell bodies of the fan blades 21 in the length direction.

Figure 3:
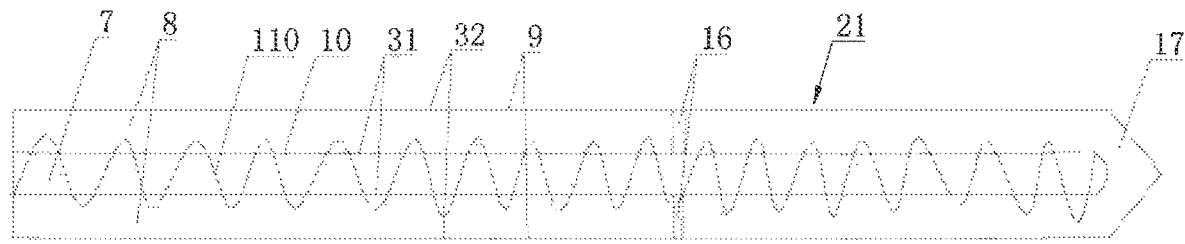
FIG. 3 is a structural schematic diagram of an A-A portion of an impeller of a power device of one embodiment of the present invention.

Furthermore, as is shown in FIG. 3, the inner fluid channels 7 are tubular, are arranged in the outer fluid channels 8, and communicate with the multiple second air ports 10 evenly distributed in the shell bodies 6 of the fan blades 21 through the communicating pipes 16, the interiors of the tubular inner fluid channels 7 are planar, and spiral flow disturbing surfaces 110 are arranged on the outer surfaces of the tubular inner fluid channels 7 to lengthen the paths of the fluid passing through the outer fluid channels to a greater extent. The cross sections of the tubular inner fluid channels 7 can be round or oval or rectangular or triangular or in other shapes and are preferably of the special structures of the spiral flow disturbing surfaces 110, so that the fluid is made to pass around the surrounding spiral surfaces circle by circle, and the paths of the fluid passing through the outer fluid channels are further lengthened by multiple times.

If the liquid passing paths are lengthened by only over three times through the spiral flow disturbing surfaces 110 (this can be achieved extremely easily), at least over three times of fluid pressure differences are generated between the inner layers and the outer layers of the fan blades of the impeller 20, and thus low-air-pressure high-speed fluid layers 15 are formed on the windward sides and the leeward sides of the outer shells 32 of the fan blades 21 and in the outer fluid channels 8 communicating with the outer shells 32 of the fan blades 21; about three times of fluid pressure differences are generated between the high-speed fluid layers 15 and the inner fluid channels 7, and about three times of pressure difference transferring layers 12 are generated around the outer shells 32 of the fan blades 21 of the impeller; in this way, most external fluid pressure is prevented from approaching the outer shells 32 of the fan blades 21, energy is converted from the most reduced fluid resistance to increase the rotating speed of the impeller by multiples, and the propelling force is increased by multiples accordingly.

Furthermore, the spiral flow disturbing surfaces 110 or the flow disturbing surfaces 11 which are concave and convex relative to the surfaces are locally or integrally formed around the inner walls 13 of the shell bodies of the fan blades 21 in the length direction, so that the paths of the fluid passing through the outer fluid channels are lengthened, and the flow speeds of the outer fluid channels are remarkably increased.

In the embodiment, the exhaust ports 17 are formed in the blade Up positions, in the direction opposite to the rotating direction, of the outer shells 32 of the fan blades 21 of the impeller 20 and communicate with the outer fluid channels, and the spiral flow disturbing surfaces lengthen the paths of the fluid passing through the outer fluid channels by several times through the spiral flow disturbing surfaces 110, so that the fan blades 21 discharge the high-speed fluid with the flow speed higher than the speed of the impeller 20 from the exhaust ports 17 which are located in the blade tip positions in the direction opposite to the rotating direction of the fan blades 21 simultaneously in the same direction, the speed of the impeller 20 is increased to the corresponding extent, and the corresponding quantity of propelling force sources are generated.

A second embodiment; Please see FIG. 1-3, the second embodiment is different from the first embodiment in that the communicating pipes 16 are removed; the inner fluid channels 7 are tubular and are arranged in the outer fluid channels 8, and the tubular inner fluid channels 7 communicate with the outer fluid channels 8 through a plurality of small second air ports 10 which are evenly distributed; the spiral flow disturbing surfaces 110 are arranged around the outer sides of the tubular inner fluid channels 7 to lengthen the paths of the fluid passing through the outer fluid channels 8, and the outer fluid channels 8 communicate with the outside through a plurality of first air ports 9; the air inlet areas of the first air ports 9 are larger than the air inlet areas of the second air ports 8. The impeller 20 rotates at a high speed to generate great centrifugal force, under the effect of the traction of the extremely great power of the centrifugal force, the fluid is made to pass through the outer fluid channels 8, provided with the spiral flow disturbing surfaces 110, in the fan blades 21 instantly through the multiple large first air ports 9, and the flow speeds are increased correspondingly; in this way, low-air-pressure high-speed fluid layers 15 are formed on the windward sides and the leeward sides of the shell bodies of the fan blades 21 and in the outer fluid channels 8 communicating with the shell bodies.

At the moment, the fluid enters the inner fluid channels 7 through the multiple small second air ports 10, so that the speed of the fluid is extremely low and lower than the speed of the fluid around the impeller; in this way, the pressure differences are generated between the inner fluid channels 7 and the high-speed fluid layers 15, pressure difference transferring rings 12 are formed around the fan blades 21 of the impeller 20, the direction of the pressure differences is opposite to the direction of the inward pressure generated by the fluid around, and the pressures are mutually counteracted; in this way, the fluid resistance around the windward sides and the leeward sides of the fan blades 21 is reduced, propelling force is obtained by reducing the fluid pressures, and accordingly the rotating speed of the impeller and the propelling force are increased.

The present invention changes the current situation that in hundreds of years from the appearance of power devices, when an impeller is driven by power or external force to rotate at a high speed, almost all loads are from the fluid resistance, only an extremely small quantity of power is used for driving the impeller to rotate normally. In this way, the first propelling force source of the present invention is as follows:

'The inner fluid layers and the outer fluid layers which have different flow speeds are formed in the shell body of the impeller: if the flow speeds of the inner layers are lower than the flow speeds of the outer layers, the power source is obtained; otherwise, power consumption is increased.'

Wherein, the larger the flow speed difference between the inner layer and the outer layer is, the larger the generated pressure difference is; the greater the flow speed of the inner layer is lower than the flow speed of the outer layer, the more the fluid resistance is reduced, and the more the first propelling force source is obtained.

On the contrary, the flow speed of an inner layer of a traditional impeller is higher than the flow speed of an outer layer of the traditional impeller, so that more fluid resistance is increased, more power consumption is increased, and the one-to-one corresponding interrelation exists.

High pressure transfers the pressure difference to low pressure in the way that water flows towards low positions according to the natural law.

The fluid pressure within a wide range of the outside around is guided into a traditional device, and on the contrary, the fluid pressure of the power device of the present invention is guided to the outside around. The unique difference between the present invention and the general common sense lies in that:

'The direction of the fluid pressure borne by the impeller of the present invention is opposite to the direction of the fluid pressure in the general common sense'.

According to the present invention, the inner layer is a low-speed layer, the outer layer is a high-speed layer, and the outward pressure difference is generated between the inner low-speed layer and the outer high-speed layer, so that the fluid resistance is reduced, and the corresponding quantity of power sources are obtained according to the reduced fluid resistance; the larger the flow speed difference between the inner layer and the outer layer is, the larger the generated pressure difference is, and the more the first propelling force source is obtained.

Otherwise, power consumption is increased. When the impeller of the traditional power device is driven to rotate at a high speed, about 90% of power is used for overcoming the fluid resistance; it is obvious that the corresponding quantity of first propelling force source is obtained from the about 90% of power consumed for overcoming the fluid resistance by counteracting the fluid pressure.

A third embodiment; The third embodiment is different from the impeller driven by power in that the power device is a power generator with an impeller driven by external force, namely wind power. When the impeller 20 is driven by the wind power to rotate at a high speed to generate great centrifugal force, under the effect of the traction of the great power of the centrifugal force, the fluid is made to pass through the outer fluid channels 8, provided with the spiral flow disturbing surfaces 110, in the fan blades 21 instantly through the multiple first air ports 9 in the outer shells 32 of the fan blades 21, so that high-speed fluid layers 15 are formed, and pressure differences are generated between the high-speed fluid layers 15 and the inner fluid channels 7 due to the different paths and different flow speeds; in this way, pressure difference transferring layers 12 are formed around the windward sides and the leeward sides of the fan blades 21 of the impeller 20, the direction of the pressure differences is opposite to the direction of the inward pressure generated by the fluid around, and thus most fluid pressure is counteracted; first propelling force is obtained by reducing the fluid pressure, so that the fluid resistance around the impeller 20 is reduced, the rotating speed of the impeller 20 is increased by multiple times, and accordingly the power generation efficiency of the power generator is improved by multiple times. In the same way, the present invention is also suitable for various impellers 20 driven by the external force, such as hydraulic power, heat power, nuclear power and wind power, to rotate.

A fourth embodiment: Please see FIGS. 2-4 and FIG. 8, the fourth embodiment is different from the third embodiment in that the power device is power generation equipment which is a fan blade-free water turbine driven by external force, namely water flow, to rotate; the power generation equipment comprises a stator and a rotor rotating in the stator, the rotor (not shown in FIGS.) is the water turbine, the water turbine is regarded as the impeller 20, and the area between every two protruding parts around a shell body of the water turbine of the impeller 20 serves as a fan blade 21; outer fluid channels 8 and inner fluid channels 7 are sequentially formed in shell bodies of the fan blades 21, and the outer fluid channels 8 and the inner fluid channels 7 communicate with the outside; drainage ports 17 are formed in the rear portions, in the rotating direction, of the fan blades correspondingly, and the drainage ports 17 communicate with a plurality of first air ports 9 evenly distributed in the shell bodies of the fan blades through the outer fluid channels 8.

Part of the inner fluid channels 7 partially or integrally communicate with the outside through communicating pipes 16 and a plurality of second air ports 10 or partially or integrally communicate with the outer fluid channels 8 through a plurality of second air ports 10. Other inner fluid channels 7 are arranged in the same way. When the water turbine driven by hydraulic power rotates, a pressure difference transferring layer 12 is formed on the shell body of each fan blade 21 of the impeller, and the direction of the pressure difference transferring layers 12 is opposite to the direction of the inward pressure of the fluid around, so that the pressures are mutually counteracted; the corresponding quantity of first propelling force source is obtained according to the quantity of mutually-counteracted fluid pressures, the rotating speed of the impeller is increased to the corresponding extent, the power generation capacity is improved to the corresponding extent, and the one-to-one corresponding interrelation exists; energy is converted from the reduced fluid resistance, so that the rotating speed of the impeller is increased, the propelling force is increased, and accordingly the propelling force source is obtained.

Furthermore, the multiple drainage ports 17 are formed in any positions of the furthest end, in the rotating direction, around the shell body of the impeller and communicate with the multiple first air ports 9 evenly distributed around the shell body of the impeller 20 through the outer fluid channels 8; other drainage ports 17 are arranged in the same way, so that the first propelling force source is obtained. Furthermore, for a fan blade-free screw impeller driven by power and external force, exhaust ports 17 of the screw impeller are formed in the furthest end, in the rotating direction, of a shell body of the impeller.

Furthermore, fan blade-free impeller 20 can be in different geometrical shapes and can be a round impeller, the screw impeller, a roller impeller, an eccentric impeller and other impellers which are driven by power or external force to rotate; as long as the structure that the inner fluid channels and the outer fluid channels which communicate with the outside and serve as low-speed layers and high-speed layers are formed in the shell bodies around the impeller is adopted, multiplied pressure difference transferring layers 12 can be generated around the impeller 20, so that part of the external fluid pressure or most external fluid pressure is prevented from approaching the shell body of the impeller 20, the rotating speed of the impeller is remarkably increased, and the first propelling force source is obtained.

In this way, the first propelling force source is converted from the reduced fluid resistance, the corresponding quantity of propelling force is obtained, the rotating speed of the impeller is increased to the corresponding extent, the power generation efficiency of the power generator or the output power of a motor is improved to the corresponding extent accordingly, and the remarkably energy saving effect is realized. The power device of the present invention comprises the impeller which is driven by power or external force; can be in difference shapes, is provided with fan blades or is not provided with fan blades, and is capable of rotating or moving linearly.

A fifth embodiment: Please see FIGS. 1-3, and the fifth embodiment is different from the first embodiment in that a plurality of first air ports 9 and a plurality of second air ports 10 are evenly formed in the leeward sides of the shell bodies of a plurality of fan blades 21 of the impeller 20 locally or integrally in the whole length direction of the shell bodies, the first air ports 9 and the second air ports 10 communicate with the outer fluid channels 8 and the inner fluid channels 7 correspondingly, and the air inlet areas of the first air ports 9 are larger than the air inlet areas of the second air ports 10.

When the impeller 20 is driven by power or external force to rotate at a high speed, the fluid bypasses to the leeward sides in the length direction from the windward sides in the width direction and then enters the outer fluid channels 8 and the inner fluid channels 7 from the multiple first air ports 9 and the multiple second air ports 10 correspondingly, great centrifugal force is generated through the high-speed rotation of the impeller 20 at the moment, under the effect of the traction of the great power of the centrifugal force, the fluid is made to pass through the outer fluid channels 8 provided with the tubular spiral flow disturbing surfaces 110 instantly through the multiple first air ports 9 in the leeward sides of the fan blades 21, and the flow speed is extremely high; in this way, the flow speeds around the multiple first air ports 9 in the shell bodies of the fan blades 21 are increased, and high-flow-speed and low-air-pressure fluid layers 15 are formed on the leeward sides of the outer shells 32 of the fan blades 21, at least multiple times of pressure differences are generated between the high-flow-speed and low-air-pressure fluid layers 15 and the inner fluid channels 7 through the spiral flow disturbing surfaces 110, pressure difference transferring layers 12 are formed on the leeward sides of the fan blades 21 of the impeller, most external fluid pressure is prevented from approaching the leeward sides of the shell bodies of the fan blades 21 accordingly, and the propelling force is increased.

Meanwhile, the fluid bypasses to the leeward sides from the windward sides of the fan blades 21 in the width direction and then flows through the leeward sides in the length direction, the length of the fan blades 21 is generally multiple times larger than the width of the fan blades 21, and the spiral flow disturbing surfaces 110 are arranged, so that the paths are lengthened at least by multiple times, larger pressure differences are generated between the windward sides and the leeward sides accordingly, the pressure difference propelling force from the windward sides to the leeward sides and from the front portion to the rear portion makes the impeller rotate at a higher speed, and thus the greater propelling force source is obtained.

In this way, the second propelling force source of the present invention is as follows:

'The fluid passes through the windward side of the impeller in the width direction and the leeward side of the impeller in the length direction, and the pressure difference generated due to the different flow speeds in the length direction and the width direction serves as the propelling force source'.

Through the second propelling force source, the propelling force is increased by multiple times on the premise that the power is not increased. In the same way, pressure difference transferring layers 12 can also be formed on the windward sides of the fan blades, so that the pressure difference propelling force source is generated due to the fact that the speed of the fluid passing through the windward sides in the length direction is difference from the speed of fluid passing through the leeward sides in the width direction.

Furthermore, the fluid passes through the shell bodies of the fan blades 21 in the length direction or the width direction, so that pressure difference transferring layers 12 are formed on the portions from blade tips to the middle portions of the shell bodies in the length direction of the shed bodies of the fan blades 21 or in the width direction of the shell bodies of the fan blades and located on the sides in the rotating direction, pressure differences are generated between the front portions and the rear portions of the shell bodies of the fan blades in the length direction due to different flow speeds, or pressure differences are generated between the left sides and the right side of the shell bodies of the fan blades in the width direction due to different flow speeds, and accordingly the propelling force source is obtained. The larger the flow speed difference between the front portions and the rear portions or between the left portions and the right portions of the shell bodies 6 of the fan blades is, the larger the generated pressure differences are, and the more power source is obtained.

In the same way, the present invention is also suitable for various impellers which are driven by various kinds of external force, such as hydraulic power, heat power, nuclear power and wind power, to rotate, the pressure difference is generated between the windward side and the leeward side, and accordingly the second propelling force source is obtained.

Generally, the length of the fan blades 21 of the wind power generator is at least about 20 times larger than the width of the fan blades 21 of the wind power generator, at least about 20 times of pressure differences are generated between the windward sides and the leeward sides, and 20 times of pressure difference propelling force generated by the about 20 times of pressure differences from the windward sides to the leeward sides as well as from the front portions to the rear portions, so that the impeller is made to rotate at a higher speed, and accordingly the greater second propelling force source is obtained.

Furthermore, in the fourth embodiment, the area between every two protruding parts around the shell body of the impeller 20 is used as a fan blade 21, and outer fluid channels 8 and inner fluid channels 7 which communicate with the outside are sequentially formed in the shell bodies of every two fan blades 21 spaced by one fan blade, so that pressure difference transferring layers 12 are formed, and accordingly the pressure difference transferring layers 12 are formed on half of the multiple fan blades around the shell body of the impeller.

In this way, in the shell bodies of every two adjacent fan blades, the high pressure generated by the low flow speed on the shell body of the fan blade in front transfers the pressure difference to the low pressure generated by the high flow speed on the pressure difference transferring layer 12 of the fan blade behind, and the pressure differences serve as the propelling force and are generated when the impeller is in a high-speed rotating inertia state; the high pressure generated by the multiple fan blades in front transfers the pressure differences to the low pressure generated by the multiple fan blades behind correspondingly, the impeller is driven to rotate at a higher speed under the effect of the pressure difference propelling force generated by the multiple fan blades; and accordingly the second propelling force source is obtained.

Furthermore, in the fourth embodiment, the fluid passes around the shell body of the impeller of the water turbine, the inner fluid channels and the outer fluid channels which communicate with the outside are formed in the left half portion or the right half portion of the shell body of the impeller; or part or most part of the shell body of the impeller or the whole shell body, so that the high-flow-speed low-pressure pressure difference transferring layers 12 are formed, the pressure differences are generated between the high-flow-speed low-pressure pressure difference transferring layers 12 and the other low-flow-speed high-pressure part of the shell body due to the high-speed movement inertia, the pressure differences serve as the propelling force, the pressure differences generated when the impeller is in a rotating inertia state drive the impeller to rotate at a higher speed; and accordingly the second propelling force source is obtained; in the same way, by arranging the inner fluid channels and the outer fluid channels around the interior of the shell body of the water turbine, the first propelling force source is obtained.

Furthermore, a pressure difference transferring layer 12 is formed on the rear half portion of the screw impeller, so that the high pressure generated by the low flow speed of the front half portion of the screw impeller transfers the pressure difference to the low pressure generated by the high flow speed of the pressure difference transferring layer on the rear half portion; the impeller is driven to rotate at a higher speed under the effect of the propelling force generated by the pressure difference, and thus the second propelling force source is obtained.

Furthermore, the pressure difference transferring layer 12 is formed on the whole impeller or part of the impeller, the impeller is driven by the propelling force formed by the pressure difference transferring layer 12 to rotate at a higher speed, and thus the second propelling force source is obtained.

Furthermore, the above structure is adopted for round impellers, screw impellers, roller impellers, eccentric impellers and other impellers not provided with fan blades and impellers which are driven by power or external force to rotate, or inner fluid channels and outer fluid channels which communicate with the outside are formed in parts of shell bodies of the impellers, so that the impellers are made to rotate at a higher speed under the effect of the greater pressure differences and propelling force generated between the parts, provided with the inner fluid channels and the outer fluid channels, of the shell bodies of the impellers and the other parts of the shell bodies of the impellers when the impellers are in the high-speed rotating state, and thus the second propelling force source is obtained.

A sixth embodiment: the sixth embodiment is different from the above embodiment in that the power device is a helicopter or an airplane driven by a propeller. Please see FIG. 1-3, the sixth embodiment is different from the first embodiment in that according to the helicopter or the airplane driven by the propeller, a plurality of first air ports 9 and a plurality of second air ports 10 are evenly formed in the windward sides and the leeward sides of outer shells 32 of a plurality of fan blades 21 of the propeller in the whole length direction of a shell body, and the first air ports 9 and the second air ports 10 communicate with inner fluid channels 8 and outer fluid channels 7 in the fan blades correspondingly; the first air ports 9 communicate with exhaust ports 17 formed in the tail ends of the fan blades 21 through the outer fluid channels 8, and the air inlet areas of the first air ports 9 are larger than the air inlet areas of the second air ports 10; the flow speed of the outer fluid channels 8 is higher than the flow speed of the inner fluid channels 7, so that pressure difference transferring layers 12 are generated between the inner channels and the outer channels, most external fluid pressure is prevented from approaching the outer shells 32, and accordingly the first propelling force source is obtained.

Furthermore, the first air ports 9 and the second air ports 10 are formed only in the windward sides and communicate with the inner fluid channels and the outer fluid channels correspondingly, pressure difference transferring layers 12 are formed on the windward sides of the outer shells 32 of the fan blades 21, and pressure differences in the direction from inside to outside are generated on the windward sides, so that the propeller is pushed by the liquid around to move upwards instantly, and the instant upward displacement of the propeller is lifting force. The larger the flow speed difference between the inner channels and the outer channels is, the larger the generated pressure differences are, and accordingly the larger the instant upward displacement of the propeller pushed by the liquid around is, the larger the generated lifting force and propelling force are.

In the hundred years since the development of the helicopter or the airplane driven by the propeller, the propeller is the unique lifting force and propelling force source, and the unique lifting force and propelling force source is regarded as the first lifting force and propelling force source.

In this way, a second lifting force and propelling force source of the helicopter or the airplane driven by the propeller of the present invention is as follows:

'The inner fluid channels and the outer fluid channels which communicate with the outside are formed in the windward sides of shell bodies of the fan blades of the propeller, and the pressure difference generated due to the fact that the flow speeds of the inner layers are lower than the flow speeds of the outer layers serves as the second lifting force and propelling force source of the helicopter.'

Furthermore, on the premise that the power is not increased, since the length of the propeller of the helicopter is generally about 20 times larger than the width of the propeller of the helicopter and spiral flow disturbing surfaces 110 are arranged in the outer fluid channels, the fluid passing paths are lengthened by at least over three times, and the fluid passing path in the length direction of the propeller is made at least about 23 times longer than the fluid passing path in the width direction of the propeller.

When the fan blades of the propeller are driven by power to rotate, since the paths of the fluid passing through the windward sides in the length direction are about 23 times longer than the paths of the fluid passing through the leeward sides in the width direction, the pressure difference is generated, and the pressure difference is the propelling force; the 23 times of pressure difference propelling force drives the propeller to rotate at a higher speed, so that the propelling force and lifting force of the propeller are increased by multiple time. In this way, a third lifting force and propelling force source of the helicopter or the airplane driven by the propeller of the present invention is as follows:

'The fluid passes through the windward sides of the fan blades of the propeller in the length direction and the leeward sides of the fan blades of the propeller in the width direction, and the pressure difference generated due to the different flow speeds in the length direction and the width direction serves as the third lifting force and propelling force source'.

On the premise that the power is not increased, the larger the difference between the fluid passing paths on the windward sides of the fan blades and the fluid passing paths on the leeward sides of the fan blades is, the larger the obtained third lifting force source of the propeller is, and the larger the generated propelling force is.

A seventh embodiment: Please see FIG. 1-5, the seventh embodiment is different from the above embodiments in that the power device is a one-stage or multi-stage impeller 20 which is coaxially connected with a rotary shaft 5, and the impeller 20 is composed of a plurality of fan blades around the impeller 20; first air ports 9 are evenly distributed in the leeward sides and the windward sides of outer shells 32 of the fan blades 21, the first air ports 9 communicate with an air suction port of an air suction motor 18 through outer fluid channels 8 via an air suction pipe 19, and exhaust ports 17 in the rear portions of the fan blades are closed at the moment.

When the impeller 20 rotates at a high speed, the fluid is sucked into the outer fluid channels 8 from the first air ports 9 evenly distributed in the leeward sides and the windward sides of the fan blades 21 at a high speed through the great suction force of the air suction motor, so that high-speed fluid layers 15 with higher flow speeds are formed at the moment, larger pressure differences are generated between the high-speed fluid layers 15 and the inner fluid channels 7, pressure difference transferring layers 12 are formed around the fan blades 21 of the impeller, most external fluid pressure is prevented from approaching shell bodies of the fan blades 21, accordingly, the rotating speed of the impeller is increased by reducing most fluid resistance, and the propelling force is increased by multiples.

Obviously, the flow speed of the fluid in the outer fluid channels and the surface of the fan blades can be increased quite easily by the air suction motor 18 with extremely low energy consumption; for example, the flow speed can be increased by ten times or even several tens of times by the air suction motor 18 quite easily, ten times or even several tens of times of pressure difference transferring layers 12 can be formed around the fan blades 21, all external fluid pressure can be prevented from approaching the fan blades 21, the impeller 20 is made to rotate in a resistance-free relative vacuum state, the rotating speed of the impeller 20 is increased by multiple times, and thus the greater propelling force source is generated. In the same way, the pressure difference can also be generated by the impeller if the air suction motor 18 is removed, and the pressure difference is smaller than the pressure difference generated under the effect of the power of the air suction motor.

In this way, the second propelling force source of the present invention is as follows:

'under the power effect or non-power effect, the pressure differences generated between the inner layer and the outer layer of the shell body of the impeller, between the windward side and/or the leeward side, between the front portions and the rear portions of the fan blades in the length direction and between the left portions and the right portions of the fan blades in the width direction due to the different paths and different flow speeds serve as the propelling force source'.

The greater propelling force is generated by the multiple fan blades of the multi-stage impeller 20 jointly, and the propelling force accumulated stage-by-stage of the multi-stage impeller is not lower than the propelling force generated by an original engine.

Furthermore, the air suction motor is removed, and the flow speed of the fluid passing through the windward sides of the fan blades in the length direction is different from the flow speed of the fluid passing through the leeward sides of the fan blades in the width direction, so that greater propelling force is generated after the pressure differences generated due to the different flow speeds of the windward side and the leeward side of the multi-stage impeller are accumulated stage-by-stage, and the structure can be used for various power devices, such as compressors, engines and stream turbines, which are driven by power.

Furthermore, the helicopter in the sixth embodiment is divided into an upper propeller structure and a lower propeller structure, and a plurality of first air ports 9 are formed in the windward side of the upper propeller structure and communicate with an air suction port of the air suction motor 18, so that the rotating speed of the upper propeller structure is even higher than the rotating speed of the lower propeller structure, and accordingly a greater pressure difference and greater lifting force are generated: or the windward side of the upper propeller and the windward side of the lower propeller are each provided with a plurality of first air ports 9, and the first air ports 9 communicate with the air suction port of the air suction motor 18, so that the greater pressure difference and greater lifting force are generated.

An eighth embodiment: the eighth embodiment is different from the above embodiment in that the air suction port of the air suction motor 18 communicates with the first air ports 9 evenly distributed in the leeward side: greater pressure difference propelling force is generated between the leeward side and the windward side through the great suction force generated by the air suction motor 18, and thus a third propelling force source is obtained.

Furthermore, as is shown in FIG. 4, a plurality of first air ports 9 are formed in the shell bodies of the fan blades 21 of the impeller 20 from the middle rear portions to the tail ends of the fan blades in the length direction and communicate with the outer fluid channels 8, and the high-speed fluid layers 15 are formed from the middle rear portions of the fan blades to the tail ends of the fan blades, so that when the fan blades rotate, pressure difference propelling force is generated between the low-speed areas from the front portions to the middle portions in the length direction and the high-speed areas from the middle portions to the rear portions in the length direction, the fan blades are made to rotate at a higher speed, and accordingly the third propelling force source is obtained.

Furthermore, by arranging the high-speed fluid layers 15 on the surfaces of the fan blades of the impeller in the width direction, between the left portions and the right portions of the fan blades 21 of the impeller 20 in the width direction, and on one side, in the rotating direction, of the impeller, pressure difference propelling force is generated between the left portions and the right portions of the fan blades, and accordingly the third propelling force source is obtained.

The propelling force can be increased by multiples only by increasing the flow speeds of the upper sides of several fan blades 21 through the air suction motor with low energy consumption: the pressure differences are increased through the combination of the first propelling force, the second propelling force and the air suction motor, and accordingly the novel third propelling force source is obtained.

In this way, the power device which is driven by power and generates high pressure and high propelling force is obtained, and in the same way, the high-power generation rate power generation device which is driven by external force and matched with the air suction motor is also obtained.

Furthermore, by the adoption of the structure, the impeller which is provided with fan blades or not provided with fan blades can also generate the third propelling force source even if the air suction motor is removed.

According to the present invention, the theory, method and device for obtaining power sources are established according to the different flow speed relation between the inner layer and the outer layer. The three propelling force sources are completely different from traditional propelling force sources, and on the premise that no extra power is increased, the three propelling force sources have a revolutionary effect on the development of various power devices which are driven by power or external force.

A ninth embodiment: As is shown in FIG. 1-6, a turbine engine comprises a multi-stage air compressor 1, a combustion chamber 2, an annular impeller 3, a multi-stage turbine 4, a rotary shaft 5 and a shell body 6, wherein the multi-stage air compressor 1, the annular impeller 3 and the multi-stage turbine 4 are sequentially and coaxially connected with the rotary shaft 5 in a non-concentric mode and are contained in the hollow shell body 6.

An air inlet 101 is formed in the front side of the hollow shell body 6, an air outlet 102 is formed in the rear side of the hollow shell body 6, and the annular impeller 3 is arranged in the combustion chamber 2; the annular impeller 3 is provided with an inner fluid channel and an outer fluid channel communicating with the inner fluid channel, namely, the outer fluid channel 8 and the inner fluid channel 7 are formed in an outer shell 32 in sequence; the space between the outer shell 32 and an inner shell 31 forms the outer fluid channel 8, and the space between the inner shell 31 and the rotary shaft 5 forms the inner fluid channel 7.

An arc-shaped flow disturbing surface 11 or a spiral flow disturbing surface 110 which is concave and convex relative to the surface is arranged on the outer wall 14 of the inner shell 31 of the outer fluid channel or the inner wall 13 of the outer shell 32 of the outer fluid channel 8 to lengthen the path of fluid passing through the outer fluid channel 8; a plurality of second air ports 10 are evenly distributed in the inner shell 31 to make the inner fluid channel 7 communicate with the outer fluid channel 8, and the outer fluid channel 8 communicates with the combustion chamber 2 through a plurality of first air ports 9 evenly distributed in the outer shell 32.

According to the operating process of the engine of the embodiment: the rotary shaft 5 is driven by power to drive the multi-stage air compressor 1, the annular impeller 3 and the multi-stage turbine 4 to rotate at a high speed, and a large quantity of fluid is sucked into the shell body 6 from the air inlet 101 of the shell body 6 through the multi-stage air compressor 1; through the coaxial and non-concentric connection way of the rotary shaft 5, the rotating speed of the annular impeller 3 is higher than the rotating speed of the multi-stage air compressor 1 in front of the annular impeller 3.

At the moment, since the flow disturbing surface 11 or the spiral flow disturbing surface 110 is arranged in the outer fluid channel 8 of the annular impeller 3, the path of the fluid passing through the outer fluid channel 8 is longer than the path of the fluid passing through the corresponding inner fluid channel 7.

Fuel sprayed out through a plurality of nozzles 201 burns rapidly in the combustion chamber 2 to generate high-temperature and high-pressure hot gas; since the rotating speed of the annular impeller 3 is higher than the rotating speed of the multi-stage air compressor 1 in front of the annular impeller 3, great centrifugal force is generated during high-speed rotation of the annular impeller 3, and the fluid is made to pass through the annular impeller 3 rapidly under the effect of the traction generated by the great power of the centrifugal force.

A high-speed fluid layer 15 is formed by the multiple first air ports 9 evenly distributed in the outer shell 32 of the annular impeller 3 and the outer fluid channel 8 jointly, so that the hot low-flow-speed and high-pressure fluid in the inner fluid channel 7 in the combustion chamber 2 inevitably transfers the pressure difference to the high-flow-speed and low-air-pressure fluid generated by the high-speed fluid layer 15 formed by the outer fluid channel 8 and the outer shell 32 through the multiple second air ports 10, a pressure difference transferring layer 12 is formed accordingly, and most external fluid pressure in the combustion chamber is prevented from approaching the outer shell 32; by reducing the fluid resistance, the rotating speed of the annular impeller 3 is made higher, and generated pressure difference propelling force is greater.

Furthermore, the spiral flow disturbing surface 110 which is concave and convex relative to the surface is arranged in the outer fluid channel 8; since the spiral flow disturbing surface 110 which is concave and convex relative to the surface surrounds the outer peripheral surface of the inner shell 31 or the inner peripheral surface of the outer shell 32, the path of the fluid passing through the spiral flow disturbing surface 110 circle by circle according to the shape of the spiral flow disturbing surface 110 is made longer, and the fuel can be better burnt in the high air pressure state.

Furthermore, the path of the hot fluid passing through the spiral flow disturbing surface 110 can be several times or even several tens of times longer than the paths of the hot fluid passing through the corresponding combustion chamber 2 and the inner fluid channel 7 quite easily, and thus the fuel has the chance to be burnt more sufficiently in the flowing process of passing through the path which is several times or even several tens of times longer than an original path.

Furthermore, another outer shell 32, another outer fluid channel 8 and another spiral flow disturbing surface 110 are arranged on the annular impeller 3, the path of the fluid passing through the outer spiral flow disturbing surface 110 is longer than the path of the fluid passing through the inner spiral flow disturbing surface 110, the pressure difference is further increased through the two outer fluid channels 8, a greater pressure difference is generated between the inner fluid channel 7 and the two outer fluid channels 8, and thus greater internal pressure is generated in the combustion chamber.

Furthermore, at least several times or even several tens of times of pressure difference can be generated quite easily since the flow speed of the fluid passing through the outer fluid channels 8 is different from the flow speed of the fluid passing through the inner fluid channel 7, greater internal pressure is generated in the combustion chamber 2 accordingly, and the engine can be made to generate greater propelling force only by increasing the pressure in a fuel chamber.

The multifold pressure difference is formed between the inner fluid channel and the outer fluid channel of the combustion chamber 2 due to the different flow speeds, the internal pressure in the combustion chamber 2 is increased by the corresponding times, and the corresponding quantity propelling force source is generated.

Please refer to the first embodiment, the outer fluid channels in all the stages of fan blades of the multi-stage air compressor communicate with the windward sides and the leeward sides through the first air ports 9, and the pressure difference transferring layers 12 are formed, so that the fluid resistance is reduced, the rotating speed of the impeller is increased correspondingly, the propelling force is increased correspondingly, and thus the first propelling force source is obtained. After the pressure differences of all the stages of the fan blades of the multi-stage air compressor are accumulated stage-by-stage, the pressure difference which is multiple times larger than the original pressure difference is formed, and accordingly the first propelling force source is obtained: in the same way, the multiplied pressure difference is generated between the windward side or/and the leeward side of each stage of the multi-stage air compressor, and then the greater second propelling force source can also be obtained after the pressure differences are accumulated stage-by-stage.

Please refer to the sixth embodiment, the air suction port of the air suction motor communicates with the outer fluid channel in each stage of fan blade of the multi-stage air compressor, so a the pressure difference transferring layer 12 is formed, and the third propelling force source is obtained. Repeated description is not given any more.

A tenth embodiment: As is shown in FIG. 1-6, a turbine engine is provided: the tenth embodiment is different from the sixth embodiment in that the inner fluid channels 7 and the outer fluid channels 8 are formed in shell bodies of fan blades 21 of the multi-stage turbine, and the pressure difference transferring layers 12 are formed. The interior of each fan blade is of a hollow structure which is as large as possible, so that multifold pressure differences are generated between the inner fluid channel and the outer fluid channel and between the windward side or/and the leeward side of each stage of fan blade of the multi-stage turbine 4, the pressure difference propelling force which is greater than the original pressure difference propelling force is formed after the multiplied pressure differences are accumulated stage-by-stage, and thus the first propelling force or the second propelling force is obtained.

Furthermore, the water turbine in the fifth embodiment is a turbine, an outer fluid channel and an inner fluid channel which communicate with the outside are formed in the left or right half portion of the shell body of the water turbine or part of the shell body of the water turbine or the whole shell body of the water turbine, so that the first propelling force source or the second propelling force source is obtained.

In the combustion chamber, the great pressure differences are generated between the inner fluid channel 7 and the outer fluid channel 8 of the annular impeller 3 and the inner fluid channel 7 and the outer fluid channel 8 of the multi-stage turbine; particularly, the paths of the fluid passing through the flow disturbing surfaces 11 arranged in the outer fluid channels 8 are longer, so that fuel is sufficiently burnt by passing through the longer paths, and through stage-by-stage accumulation of the multi-stage impeller of the turbine 5 and the annular impeller 3, the fuel is sufficiently burnt when passing through the longer paths, and accordingly greater propelling force is generated.

When the engine operates, the fluid enters the engine from the air inlet 101, great internal force is generated through stage-by-stage accumulation of the multi-stage air compressor, the fluid passes through the inner fluid channel 7 and the outer fluid channel 8 formed in at least one of the annular impeller 3, the shell body of the turbine 4 and each fan blade of the multi-stage turbine along long paths, and is discharged from the air outlet 102. Through the continuity of the fluid, the space is changed in the state that the time is not changed when the annular impeller 3 and the multi-stage turbine 4 move at high speeds, and the burning fluid passes through the burning paths lengthened due to the space change at a higher speed; the burning fluid passes through the burning paths which are multiple times or even several tens of times longer than original paths easily at the higher speed, it seems that the internal space of the combustion chamber is enlarged by several tens of times, the fuel has the chance to pass through the paths which are lengthened by several tens of times to be burnt more sufficiently, the flow speed of the fluid in the combustion chamber is increased by several tens of times through the continuity of the fluid, and the fluid is discharged backwards to make the engine generate greater propelling force.

Furthermore, even if the annular impeller 3 is removed, a remarkable effect can be realized through the above structure.

In this way, the first power source of the combustion chamber of the present invention is found as follows:

'When the fluid in the combustion chamber moves at the high speed, the space is changed while the time is not changed, and the fluid passes through the inner fluid channel and the outer fluid channel along long paths, so that the fuel has the chance to be sufficiently burnt under the condition, and accordingly the corresponding quantity of propelling force source is generated'.

The second power source of the combustion chamber of the present invention is found as follows:

'The pressure difference is generated due to the different flow speeds of the inner fluid channel and the outer fluid channel in the combustion chamber, so that the corresponding quantity of internal pressure is generated, and the corresponding quantity of power source is obtained'.

The first power source is based on the continuity of the fluid, the combustion chamber is not enlarged actually, and in fact the fluid passes through the inner fluid channel and the outer fluid channel along the longer paths at the higher movement speed; in the state that the paths are changed while the time is not changed, the fuel has the chance to be sufficiently burnt in the long paths, the paths can be lengthened by several tens of times quite easily to make the fuel be burnt sufficiently, and the greater propelling force can be generated only by burning the fuel sufficiently.

The second power source of the combustion chamber of the present invention is as follows: The pressure difference is generated due to the different flow speeds of the inner fluid channel and the outer fluid channel in the multi-stage air compressor 1 or the annular impeller 3 or each fan blade 21 of the multi-stage turbine 4, and thus greater internal pressure of the engine is obtained; the larger the flow speed difference between the inner fluid channel and the outer fluid channel of the impeller is, the larger the internal pressure is, and the larger the generated propelling force is. What deserves to be mentioned is that the flow speed of the fluid in the engine is increased by several tens of times, the greater internal pressure is sprayed outwards, and thus the greater propelling force is generated.

The greater propelling force generated by the turbine engine is as follows: firstly, the outer fluid channels 8 of all the stages of fan blades of the multi-stage air compressor and the multi-stage turbine 4 communicate with the windward sides and the leeward sides through the first air ports 9, so that the pressure difference transferring layers 12 are formed, the fluid resistance is reduced to a certain extent, the speed of the impeller 20 is increased to the corresponding extent, the propelling force is increased to the corresponding extent, and the first propelling force source is obtained; secondly, the multiplied pressure differences are generated between the windward sides or/and the leeward sides of all the stages of fan blades of the multi-stage air compressor and the multi-stage turbine 4, then the multiplied pressure differences are accumulated stage-by-stage to form the pressure difference propelling force which is multiple times larger than original pressure difference propelling force, and thus the second propelling force source is obtained; thirdly, the air suction port of the air suction motor communicates with the outer fluid channels in the fan blades of the air compressor, so that the pressure difference transferring layers 12 are formed, and accordingly the third propelling force source is obtained; fourthly, the fluid enters the outer fluid channels 8 in the fan blades, passes through the spiral flow disturbing surfaces 110 and the whole fan blades 21 in the length direction and is discharged from the exhaust ports 17 in the blade tips on the sides opposite to the rotating direction of the fan blades simultaneously in the same direction, and the propelling force is generated by the fluid with the flow speed multiple times higher than the fluid around.

The power source of the combustion chamber is as follows: the fluid passes through the inner fluid channel and the outer fluid channel of the shell body of the turbine 4, the inner fluid channel and the outer fluid channel of each stage of fan blade of the impeller and the inner fluid channel and the outer fluid channel of the annular impeller of the turbine 4 along the paths, and particularly the flow disturbing surfaces are arranged in the outer fluid channels, so that the paths of the fuel in the combustion chamber are lengthened by several tens of times, the fuel has the chance to be sufficiently burnt, the several tens of times of flow speed is generated at the same time, and accordingly the greater propelling force is generated.

The present invention is different from a traditional turbine engine theory and structure; the first propelling force source, the second propelling force source and the third propelling force source are not utilized in the space and time are found in the present invention, and thus a super turbine engine which is of a novel theory and structure is generated.

Figure 7:
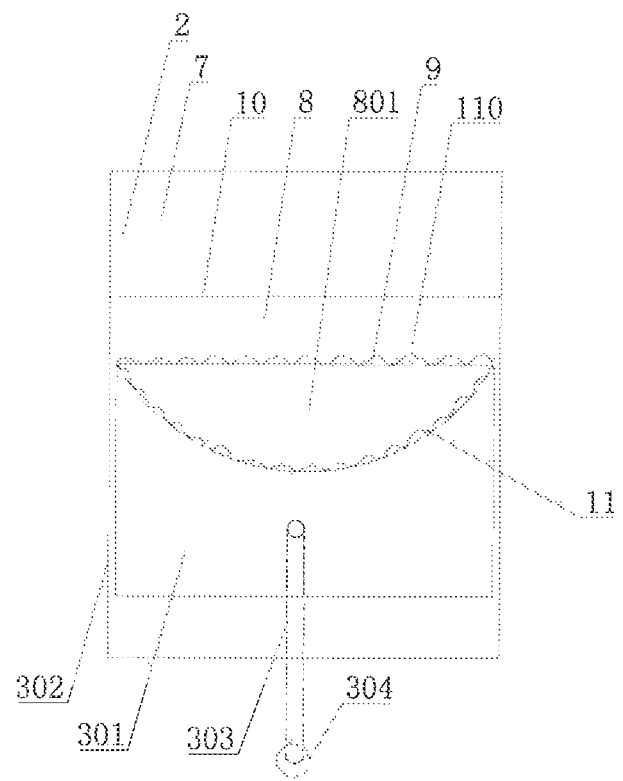
FIG. 7 is an integral structural schematic diagram of an automobile engine of one embodiment of the present invention.
Figure 8:
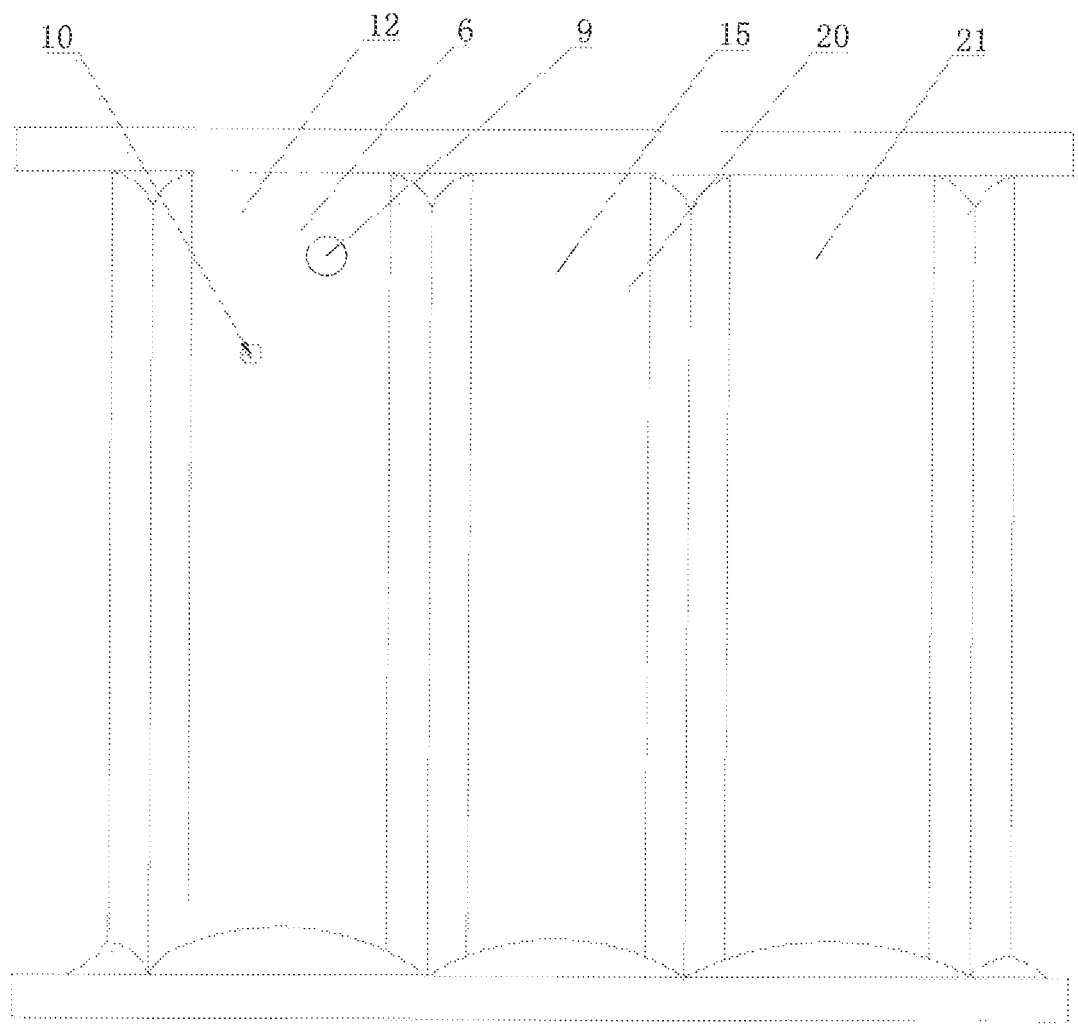
FIG. 8 is a structural schematic diagram of an impeller of a power device of one embodiment of the present invention.
Figure 9:
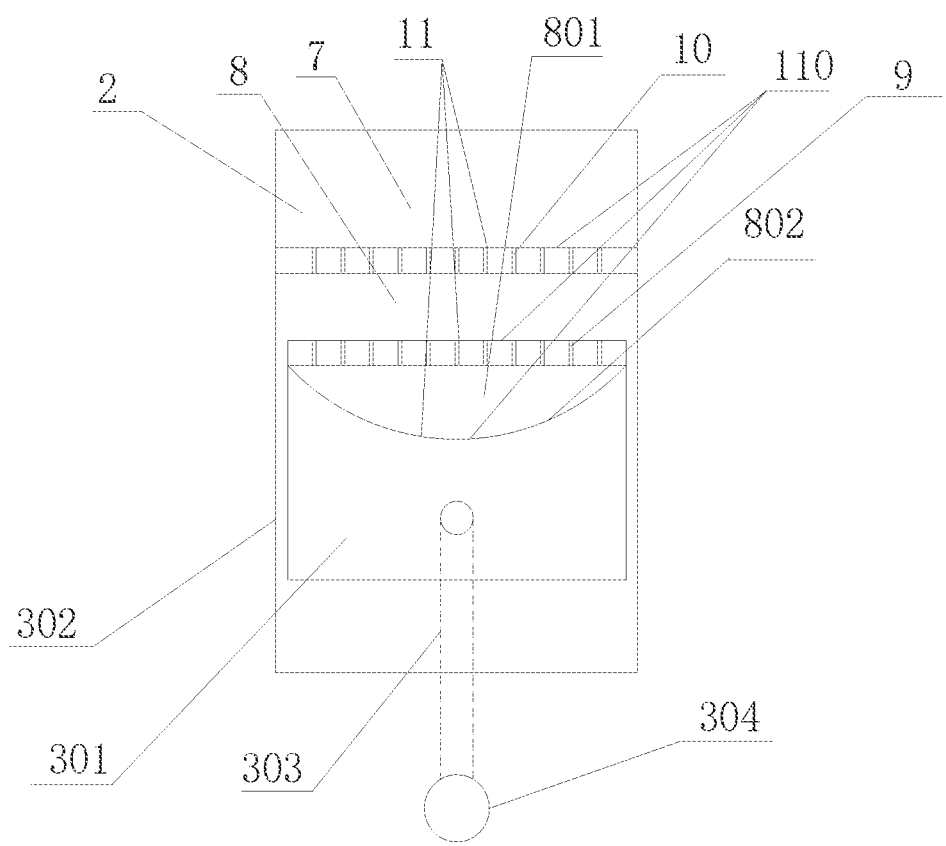
FIG. 9 is an integral structural schematic diagram of an automobile engine of one embodiment of the present invention.

An eleventh embodiment; As is shown in FIG. 7 and FIG. 9, the power device is an impeller, namely a piston, which is driven by power to move linearly; an automobile engine comprises a plurality of air cylinders 302, and combustion chambers 2 and pistons 301 are arranged in the air cylinders; in each combustion chamber 2, an inner fluid channel 7 and an outer fluid channel 8 communicating with the inner fluid channel 7 are formed, the inner fluid channel 7 communicates with the outer fluid channel 8 through a plurality of second air ports 10 evenly arranged on a bulkhead, and the outer fluid channel 8 communicates with an outer fluid channel 801 formed in the corresponding piston through a plurality of first air ports 9 evenly arranged on the bulkhead. Flow disturbing surfaces 11 or spiral flow disturbing surfaces 110 are arranged in the outer fluid channels 8 and the outer fluid channels 801 in the pistons correspondingly to lengthen fluid passing paths to a greater extent; through various flow disturbing surfaces and particularly through the spiral flow disturbing surfaces 110, the fluid is made to rotate along spiral lines which are concave or convex relative to the surface circle by circle, the paths are greatly lengthened and are lengthened by at least multiple times compared with the paths in the inner fluid channels 4, and the fluid passing paths in the outer fluid channel 801 in the pistons are also longer than the fluid passing paths in the outer fluid channels 8.

It can be seen from FIG. 7 that the combustion chamber 2 includes an inner fluid channel 7; the inner fluid channel 7 of the combustion chamber 2 is not provided with a flow disturbing device, so that the flow rate of the inner fluid channel is equal to the flow rate in the combustion chamber. There is no difference between them (the inner channel is only a unified statement corresponding to the pressure difference between the inner and outer layers of the impeller housing in the above embodiment, and does not have any practical effect in this embodiment).

In this embodiment, the inside and outside of the piston are provided with communicating channels, so for the convenience of description: the outer fluid channel outside the piston is called the piston outer channel 8; the outer fluid channel in the pistons is called the piston outer channel 801.

When the automobile engine operates, compressed gas is delivered by a gas delivery pipe and enters the combustion chambers 2, fuel in the combustion chambers 2 is ignited and burnt at the same time, the pressure formed by the high-temperature, high-pressure, high-flow-speed expanding burning gas is generated instantly, and the instantly-expanding burning gas is diffused around: high pressure is generated by the low flow speed since the fluid passing paths in the combustion chambers 2 are short, low pressure is generated by the high flow speed since the fluid passing paths in the piston outer channel 8 are long, and the high pressure transfers the pressure difference to the low pressure; pressure differences are also transferred from the piston outer channel 8 to the piston inner channel 801 with higher flow speeds, in the pistons, and the pressure differences are transferred layer-by-layer, so that the pressure in the combustion chambers is remarkably increased, the fluid in the combustion chambers is made to pass through long paths which is multiple times longer than original paths, and propelling force is generated by the pressure differences; meanwhile, in the process that the burning fluid passes through the long paths, the fuel has the chance to be burnt sufficiently, and the automobile engine can generate a greater propelling force source to drive the pistons to drive connecting rods 303 and crankshafts 304 only by making the fuel be burnt sufficiently, and thus an automobile is driven to travel; PM 2.5 emission is also greatly reduced after the fuel is sufficiently burnt, and more energy is saved. In this way, the first power source of the combustion chambers is obtained.

A combustion chamber in an engine air cylinder of an automobile engine in the prior art is extremely small, and consequentially it is quite difficult to burn fuel sufficiently; in the present invention, the pressure differences generated by the piston outer channel 8 and the piston inner channel 801 in the combustion chambers and the outer fluid channels in the pistons all act in the pistons, and the internal pressure of the combustion chambers is remarkably increased; meanwhile, the fuel has the chance to be burnt sufficiently when passing through the inner fluid channels and the outer fluid channels of the pistons along the longer paths, so that the automobile engine is made to generate greater propelling force, and PM 2.5 emission is also greatly reduced by making the fuel be burnt sufficiently.

Furthermore, only the inner fluid channels 7 in the combustion chambers, the combustion chambers communicate with the piston inner channel 801 through the multiple first air ports 9, so that the fluid passing paths are lengthened to a greater extent, and the internal spaces of the combustion chambers are expanded to a greater extent.

Furthermore, the combustion chambers communicate with the piston outer channel 8 and the piston inner channel 801 through air ports on the bulkhead, the flow disturbing surfaces 11 or the spiral flow disturbing surfaces 110 are formed in at least one of the bulkhead, the piston outer channel 8 and the piston inner channel 801 to lengthen the fluid passing paths, and the piston outer channel 8 communicate with the piston inner channel 801 through the multiple first air ports 9; at the moment, the paths of the fluid passing through the piston inner channel 801 are longer than the paths of the fluid passing through the piston outer channel 8, and the paths of the fluid passing through the piston outer channel 8 are longer than the paths of the fluid passing through the combustion chambers, so that the pressure differences generated in the combustion chambers layer-by-layer all act on the interiors of the pistons and housing of the pistons, and thus the internal pressure of the combustion chambers is remarkably increased.

Arc-shaped bottom surfaces which are concave and concave relative to the surfaces are arranged on surface of the bottommost 802 of the piston inner channel 801, so that the stress areas of the superficial areas of the bottoms 802 of the pistons are enlarged, high pressure formed by the expanding burning gas in the combustion chambers directly acts on the larger arc-shaped bottom 802 stress areas in the piston inner channel 801, and thus greater propelling force is generated by the pistons.

Furthermore, flow disturbing devices used for lengthening the fluid passing paths are arranged on the concave or convex arc-shaped bottom surfaces, so that the stress areas of surfaces of the bottom 802 of the pistons are further enlarged, and the fluid passing paths are lengthened to a greater extent.

Greater pressure in the air cylinders can be obtained through the pressure differences which are generated layer-by-layer in the present invention; the larger the fluid passing path difference between the inner fluid channels and the outer fluid channels is, the larger the flow speed difference between the inner fluid channels and the outer fluid channels is, the larger the obtained internal pressure in the combustion chambers is, the larger the generated propelling force is, and thus the second power source in the combustion chambers is obtained.

It can be seen that on the premise of not increasing extra power consumption, the first power source of the combustion chambers of the present invention is obtained through the sufficient fuel burning spaces formed by lengthening the paths; the second power source is obtained through the pressure differences generated due to the different flow speeds between the inner fluid channels and the outer fluid channels; through the first power source and the second power source of the combustion chambers of the present invention, the propelling force of the engine is greatly increased, and a novel development approach is provided for the automobile engine.

In conclusion, based on the fundamental problem that propelling force can be generated by power devices, the power device which has three novel propelling force sources and can generate greater propelling force is provided in the present invention; the situation that the flow speed of an inner layer of a traditional impeller is higher than the flow speed of an outer layer of the traditional impeller is changed; according to the present invention, the flow speed of the inner layer is lower than the flow speed of the outer layer, the larger the flow speed difference between the inner layer and the outer layer is, the more obtained power sources are; otherwise, more power is consumed. The fluid pressure generated by outside water and air is guided to the traditional power device, so that 90% of power has to be consumed to overcome the fluid resistance, and it is obvious that the power device of the present invention guides the fluid pressure to the outside. The present invention is suitable for power devices capable of generating greater propelling force through fluid in water and air; in this way, the novel power sources creatively found by the present invention are as follows:

The first propelling force source of the power device is that: 'the inner fluid layer and the outer fluid layer which have different flow speeds are formed in the shell body of the impeller, and if the flow speed of the inner layer is lower than the flow speed of the outer layer, the power source is obtained; otherwise, power consumption is increased'.

The second propelling force source of the power device is that: 'the fluid passes through the windward side of the impeller in the width direction and the leeward side of the impeller in the length direction, and the pressure difference generated due to the different flow speeds in the length direction and the width direction serves as the propelling force source'.

The third propelling force source of the power device is that: 'under the power or non-power effect, the greater pressure differences generated between the inner layer and the outer layer in the shell body of the impeller, between the windward side and/or the leeward side, between the front portions and the rear portions in the length direction of the fan blades, and between the left portions and the right portions in the width direction of the fan blades due to the different paths and different flow speeds serve as the propelling force source'.

The second lifting force and propelling force source of the helicopter or airplane driven by the propeller is that: 'The inner fluid layers and the outer fluid layers which communicate with the outside are formed in the windward sides of the shell bodies of the fan blades of the impeller, and the pressure difference generated due to the fact that the flow speed of the inner layers is lower than the flow speed of the outer layers serves as the second lifting force and propelling force source of the helicopter.'

The third lifting force and propelling force source of the helicopter or airplane driven by the propeller is that: 'The fluid passes through the windward sides of the fan blades of the propeller in the length direction and the leeward sides of the fan blade of the propeller in the width direction, and the pressure difference generated due to the fact that the flow speed in the length direction is different from the flow speed in the width direction serves as the third lifting force and propelling force source'.

The first power source of the combustion chamber of the engine is that: 'During high-speed movement of the fluid in the combustion chamber, the space is changed while the time is not changed, and the flow speed is increased according to the paths of the fluid passing through the inner channel and the outer channel, so that the fuel has the chance to be sufficiently burned under the condition, and accordingly the propelling force source is generated'.

The second power source of the combustion chamber is that: 'The pressure difference is generated in the combustion chamber due to the different flow speeds of the inner channel and the outer channel, the corresponding internal pressure is generated, and the corresponding power source is obtained'.

Based on the three propelling force sources of the power device, various different propelling force sources can be found for different power devices and different movement devices.

The present invention is based on the foundational core problem that propelling force sources are generated by the power device on the premise of not increasing extra power and is completely different from the traditional power device using the propelling force source generated by counteracting force for hundreds of years, and the three propelling force sources which are generated by the pressure differences and not utilized in the space and time are found; on this basis, the two lifting force or propelling force sources of the helicopter or airplane driven by the propeller are further found, and the two propelling force sources obtained by making the fuel in the combustion chamber of the engine be brunt sufficiently is also further found; a novel approach is created for the development of the power device, and the present invention will have far-reaching influences on the future development of energy and power devices.

The above description is only the embodiments of the present invention, the patent scope of the present invention is not limited in the above description, and all equivalent transformations based on the content of description and the drawings of the present invention or directly or indirectly applied to the relevant technical fields are included in the patent protection scope of the present invention.

The invention claimed is:

1. An automobile engine, comprising an air cylinder, a combustion chamber provided in the air cylinder and a piston provided in the air cylinder, wherein
   the air cylinder comprises the combustion chamber, a piston outer channel and a piston inner channel, the combustion chamber comprises an inner fluid channel and communicates with the piston outer channel through a plurality of second air ports, and the piston outer channel communicates with the piston inner channel through a plurality of first air ports; flow disturbing devices are arranged in the piston outer channel and the piston inner channel correspondingly to lengthen fluid passing paths, so that fuels pass through a longer path to be fully burned during a combustion process; the flow disturbing devices in the piston inner channel make a path of fluid larger than a path of fluid passing through the combustion chamber and larger than a path of fluid passing through the piston outer channel to generate a pressure difference, and the pressure difference causes the combustion chamber, the piston outer channel and the piston inner channel to generate pressure in the same direction layer by layer and superimpose, and form a larger pressure inside the air cylinder to act on a housing of the piston and hollow interior of the piston, so that a larger stress area is generated between an inner space of the piston and the housing of the piston.

2. The automobile engine according to claim 1, wherein a bottom of the piston inner channel is an arc shaped surface, so a stress area of a hollow bottom of the piston is enlarged, so that a fluid pressure in the air cylinder creates a propelling force from inside of the piston.

3. The automobile engine according to claim 1, wherein the flow disturbing devices are flow disturbing surfaces concave and convex on a surface of the housing of the piston to extend a path of fluid.

4. The automobile engine according to claim 1, wherein the flow disturbing devices are spiral flow disturbing surfaces concave and convex on surface of the housing of the piston, so that a fluid passes through the spiral flow disturbing surfaces circle by circle to extend a path of fluid.

5. The automobile engine according to claim 2, wherein the arc shaped surface of the bottom of the piston inner channel is provided with additional flow disturbing devices flow disturbing devices to form larder stress areas inside the piston, so that the fluid pressure in the air cylinder creates the propelling force from inside of the piston.

6. The automobile engine according to claim 1, wherein the flow disturbing devices are formed on at least one of the piston outer channel, interior of the piston inner channel, or an arc surface of a bottom of the piston inner channel.

7. An automobile engine, comprising an air cylinder, a combustion chamber provided in the air cylinder and a piston provided in the air cylinder, wherein the air cylinder comprises the combustion chamber and a piston inner channel, the piston inner channel is arranged in a hollow area inside the piston, the combustion chamber comprises an inner fluid channel and communicates with the piston inner channel through a plurality of first air ports; flow disturbing devices are arranged in the piston inner channel to lengthen fluid passing paths, so that fuels pass through a longer path to be fully burned during a combustion process:
   the flow disturbing devices in the piston inner channel make a path of fluid larger than a path of fluid passing through the combustion chamber to generate a pressure difference, and the pressure difference causes the combustion chamber and the piston inner channel to generate pressure in the same direction and superimpose, and form a larger pressure inside the air cylinder to act on the housing of the piston and hollow interior of the piston, so that a larger stress area is generated between an inner space of the piston and the housing of the piston, the automobile engine creates a larger propelling force.

8. The automobile engine according to claim 7, wherein a bottom of the piston inner channel is an arc shaped surface to enlarge a stress area, so that a fluid pressure in the air cylinder creates a propelling force from inside of the piston.

9. The automobile engine according to claim 7, wherein the flow disturbing devices are flow disturbing surfaces concave and convex on surface of the housing of the piston to extend a path of fluid.

10. The automobile engine according to claim 7, wherein the flow disturbing devices are spiral flow disturbing surfaces concave and convex on surface of the housing of the piston, so that a fluid passes through the spiral flow disturbing surfaces circle by circle to extend a path of fluid.

11. The automobile engine according to claim 8, wherein the arc shaped surface of the bottom of the piston inner channel is provided with additional flow disturbing devices to form larger stress areas inside the piston with the additional flow disturbing devices, so that the fluid pressure in the aft cylinder creates the propelling force from inside of the piston.

* * * * *